US012782970B2

(12) United States Patent
Shim et al.

(10) Patent No.: US 12,782,970 B2
(45) Date of Patent: Nov. 3, 2026

(54) METHOD AND APPARATUS FOR AUTONOMOUS DELIVERY ROBOT-BASED DELIVERY SERVICE

(71) Applicant: Electronics and Telecommunications Research Institute, Daejeon (KR)

(72) Inventors: Taehyoung Shim, Sejong-si (KR); Jun Seob Lee, Daejeon (KR); Jeongil Yim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 126 days.

(21) Appl. No.: 18/415,022

(22) Filed: Jan. 17, 2024

(65) Prior Publication Data

US 2024/0255960 A1 Aug. 1, 2024

(30) Foreign Application Priority Data

Jan. 27, 2023 (KR) ........................ 10-2023-0010786
Mar. 20, 2023 (KR) ........................ 10-2023-0036003

(Continued)

(51) Int. Cl.
*G05D 1/667* (2024.01)
*G05D 1/693* (2024.01)

(Continued)

(52) U.S. Cl.
CPC ............. *G05D 1/667* (2024.01); *G05D 1/693* (2024.01); *G06Q 10/0833* (2013.01); *G05D 2101/22* (2024.01); *G05D 2105/28* (2024.01)

(58) Field of Classification Search
CPC .... G05D 1/667; G05D 1/693; G05D 2101/22; G05D 2105/28; G05D 2105/285;

(Continued)

(56) References Cited

U.S. PATENT DOCUMENTS

2020/0125109 A1* 4/2020 Velten .................... B65G 65/00
2020/0174475 A1 6/2020 Min et al.

(Continued)

FOREIGN PATENT DOCUMENTS

KR 10-2020-0013135 A 2/2020
KR 10-2022-0032857 A 3/2022

(Continued)

OTHER PUBLICATIONS

Lee et al. "Initial text of draft new Recommendation ITU-T Y.DRI-reqts "Requirements for autonomous urban delivery robots interworking"" *International Telecommunication Union Telecommunication Standardization Sector* Jul. 18-22, 2022 (pp. 1-5).

(Continued)

*Primary Examiner* — Anne Marie Antonucci
*Assistant Examiner* — Jodi Jones
(74) *Attorney, Agent, or Firm* — NSIP Law

(57) ABSTRACT

A method and apparatus for an autonomous delivery robot-based delivery service are disclosed. An operating method of a delivery robot includes moving to a pick-up location through autonomous driving based on delivery information generated by a delivery robot service provider, loading goods at the pick-up location, delivering the goods to a delivery location through autonomous driving based on the delivery information, and sharing a current location of the delivery robot and a loading status of the goods with the delivery robot service provider.

14 Claims, 12 Drawing Sheets

(30) Foreign Application Priority Data

| | | |
|---|---|---|
| Mar. 22, 2023 | (KR) | 10-2023-0037248 |
| Apr. 18, 2023 | (KR) | 10-2023-0050465 |
| Jun. 23, 2023 | (KR) | 10-2023-0081282 |
| Jul. 6, 2023 | (KR) | 10-2023-0088043 |
| Jul. 11, 2023 | (KR) | 10-2023-0089613 |
| Jan. 10, 2024 | (KR) | 10-2024-0004004 |

(51) Int. Cl.

*G05D 101/00* (2024.01)
*G05D 105/28* (2024.01)
*G06Q 10/0833* (2023.01)

(58) Field of Classification Search

CPC ........... G05D 2107/17; G05D 2109/10; G05D 1/225; G06Q 10/0833; G08G 1/096725; G08G 1/096741; G08G 1/096775; G08G 1/202

USPC ......... 701/117, 119, 1, 23, 533, 2, 423, 532, 701/468, 25, 300, 409, 420, 411, 29.3; 705/28, 338

See application file for complete search history.

(56) References Cited

U.S. PATENT DOCUMENTS

| | | | | |
|---|---|---|---|---|
| 2020/0174492 | A1 | 6/2020 | Lee et al. | |
| 2020/0406459 | A1* | 12/2020 | Park | G06V 20/20 |
| 2021/0004024 | A1* | 1/2021 | Whitfield, Jr. | G05D 1/0289 |
| 2021/0256465 | A1* | 8/2021 | Väin | G06Q 10/08355 |
| 2022/0113731 | A1 | 4/2022 | Yesh et al. | |
| 2022/0253059 | A1* | 8/2022 | Pandey | G05D 1/0274 |
| 2022/0366364 | A1* | 11/2022 | Otsuki | G05D 1/693 |

FOREIGN PATENT DOCUMENTS

| | | | |
|---|---|---|---|
| KR | 10-2473630 | B1 | 12/2022 |
| KR | 10-2023-0007904 | A | 1/2023 |

OTHER PUBLICATIONS

Shim et al. "Y.DRI-reqts: Propose updates on clause 6, 7 and 8" *International Telecommunication Union Telecommunication Standardization Sector* Feb. 10, 2023 (pp. 1-8).

* cited by examiner

METHOD AND APPARATUS FOR AUTONOMOUS DELIVERY ROBOT-BASED DELIVERY SERVICE

CROSS-REFERENCE TO RELATED APPLICATION(S)

This application claims the priority benefit of Korean Patent Application No. 10-2023-0010786 filed on Jan. 27, 2023, Korean Patent Application No. 10-2023-0036003 filed on Mar. 20, 2023, Korean Patent Application No. 10-2023-0037248 filed on Mar. 22, 2023, Korean Patent Application No. 10-2023-0050465 filed on Apr. 18, 2023, Korean Patent Application No. 10-2023-0081282 filed on Jun. 23, 2023, Korean Patent Application No. 10-2023-0088043 filed on Jul. 6, 2023, Korean Patent Application No. 10-2023-0089613 filed on Jul. 11, 2023, and Korean Patent Application No. 10-2024-0004004 filed on Jan. 10, 2024, in the Korean Intellectual Property Office, the disclosures of which are incorporated herein by reference for all purposes.

BACKGROUND

1. Field

One or more embodiments relate to a method and apparatus for an autonomous delivery robot-based delivery service.

2. Description of Related Art

An autonomous delivery robot service may be a service where delivery robots deliver goods by interworking with urban infrastructure and other entities.

For the autonomous delivery robot service, an interworking protocol between the entities (e.g., delivery robots, service providers, users, or infrastructure) may be required.

The above description has been possessed or acquired by the inventor(s) in the course of conceiving the present disclosure and is not necessarily an art publicly known before the present application is filed.

SUMMARY

An aspect provides an interworking method for an autonomous delivery robot-based delivery service.

However, technical aspects are not limited to the foregoing aspect, and there may be other technical aspects.

According to an aspect, an operating method of a delivery robot includes moving to a pick-up location through autonomous driving based on delivery information generated by a delivery robot service provider. The operating method may include loading goods at the pick-up location. The operating method may include delivering the goods to a delivery location through autonomous driving based on the delivery information. The operating method may include sharing a current location of the delivery robot and a loading status of the goods with the delivery robot service provider.

The delivery information may include at least one of the pick-up location of the goods, the delivery location of the goods, a delivery time of the goods, information on infrastructure that the delivery robot needs to interwork with for the delivery of the goods, a delivery route of the goods, and a type of the goods.

The delivery robot service provider may retain information on infrastructure that interworks with the delivery robot.

The operating method may further include interworking with an infrastructure located on a delivery route of the goods.

The operating method may further include notifying the delivery robot service provider of a result of direct interworking with the infrastructure.

The delivery robot service provider may determine an access priority to the infrastructure between the delivery robot and another delivery robot based on the presence of the other delivery robot competing with the delivery robot to access the infrastructure.

The delivery robot service provider may determine the access priority by interworking with another delivery robot service provider when the other delivery robot is managed by the other delivery robot service provider.

The delivery robot service provider may transmit the loading status of the goods or an unloading status of the goods to a corresponding user device.

The operating method may further include directly interworking with another delivery robot located at a preset distance from the delivery robot.

The directly interworking may include directly interworking with the other delivery robot, based on at least one of the prediction of a collision between the delivery robot and the other delivery robot and a congestion level related to a space surrounding the delivery robot.

According to another aspect, a delivery robot includes a processor and a memory configured to store instructions. When the instructions are executed by the processor, the instructions may cause the delivery robot to perform a plurality of operations. The plurality of operations may include moving to a pick-up location through autonomous driving based on delivery information generated by a delivery robot service provider based on a delivery request of a user. The plurality of operations may include loading goods at the pick-up location. The plurality of operations may include delivering the goods to a delivery location through autonomous driving based on the delivery information. The plurality of operations may include sharing a current location of the delivery robot and a loading status of the goods with the delivery robot service provider.

The delivery information may include at least one of the pick-up location of the goods, the delivery location of the goods, a delivery time of the goods, information on infrastructure that the delivery robot needs to interwork with for the delivery of the goods, a delivery route of the goods, and a type of the goods.

The delivery robot service provider may retain information on infrastructure that interworks with the delivery robot.

The plurality of operations may further include interworking with infrastructure located on a delivery route of the goods.

The plurality of operations may further include notifying the delivery robot service provider of a result of direct interworking with the infrastructure.

The delivery robot service provider may determine an access priority to the infrastructure between the delivery robot and another delivery robot based on the presence of the other delivery robot competing with the delivery robot to access the infrastructure.

The delivery robot service provider may determine the access priority by interworking with another delivery robot service provider when the other delivery robot is managed by the other delivery robot service provider.

The delivery robot service provider may transmit the loading status of the goods or an unloading status of the goods to a corresponding user device.

The plurality of operations may further include directly interworking with another delivery robot located at a preset distance from the delivery robot.

The directly interworking may include directly interworking with the other delivery robot, based on at least one of the prediction of a collision between the delivery robot and the other delivery robot and a congestion level related to a space surrounding the delivery robot.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1:
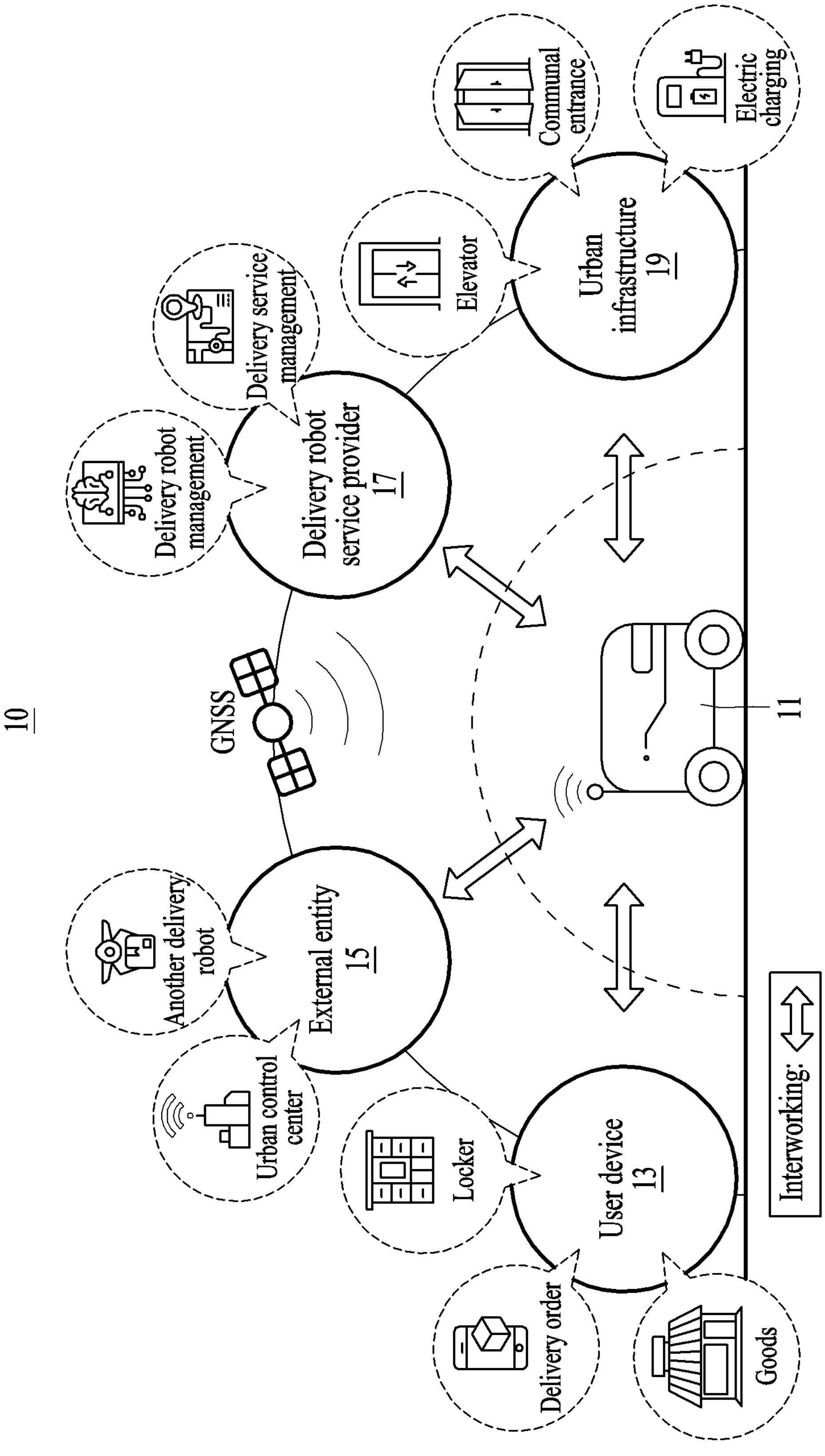
FIGS. 1 and 2 are diagrams each illustrating a delivery robot service system according to an embodiment.

The following detailed structural or functional description is provided as an example only and various alterations and modifications may be made to the examples. Here, examples are not construed as limited to the disclosure and should be understood to include all changes, equivalents, and replacements within the idea and the technical scope of the disclosure.

Terms, such as first, second, and the like, may be used herein to describe various components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a," "an," and "the" are intended to include the plural forms as well, unless the context clearly indicates otherwise. As used herein, "A or B", "at least one of A and B", "at least one of A or B", "A, B or C", "at least one of A, B and C", and "at least one of A, B, or C," each of which may include any one of the items listed together in the corresponding one of the phrases, or all possible combinations thereof. It will be further understood that the terms "comprises/including" and/or "includes/including" when used herein, specify the presence of stated features, integers, operations, operations, elements, and/or components, but do not preclude the presence or addition of one or more other features, integers, operations, operations, elements, components and/or groups thereof.

Unless otherwise defined, all terms, including technical and scientific terms, used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used in connection with the present disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

The term "unit" or the like used herein may refer to a software or hardware component, such as a field-programmable gate array (FPGA) or an ASIC, and the "unit" performs predefined functions. However, "unit" is not limited to software or hardware. The "unit" may be configured to reside on an addressable storage medium or configured to operate one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operate on one or more central processing units (CPUs) within a device or a security multimedia card. In addition, "unit" may include one or more processors.

Hereinafter, embodiments will be described in detail with reference to the accompanying drawings. When describing the embodiments with reference to the accompanying drawings, like reference numerals refer to like elements and a repeated description related thereto will be omitted.

Figure 2:
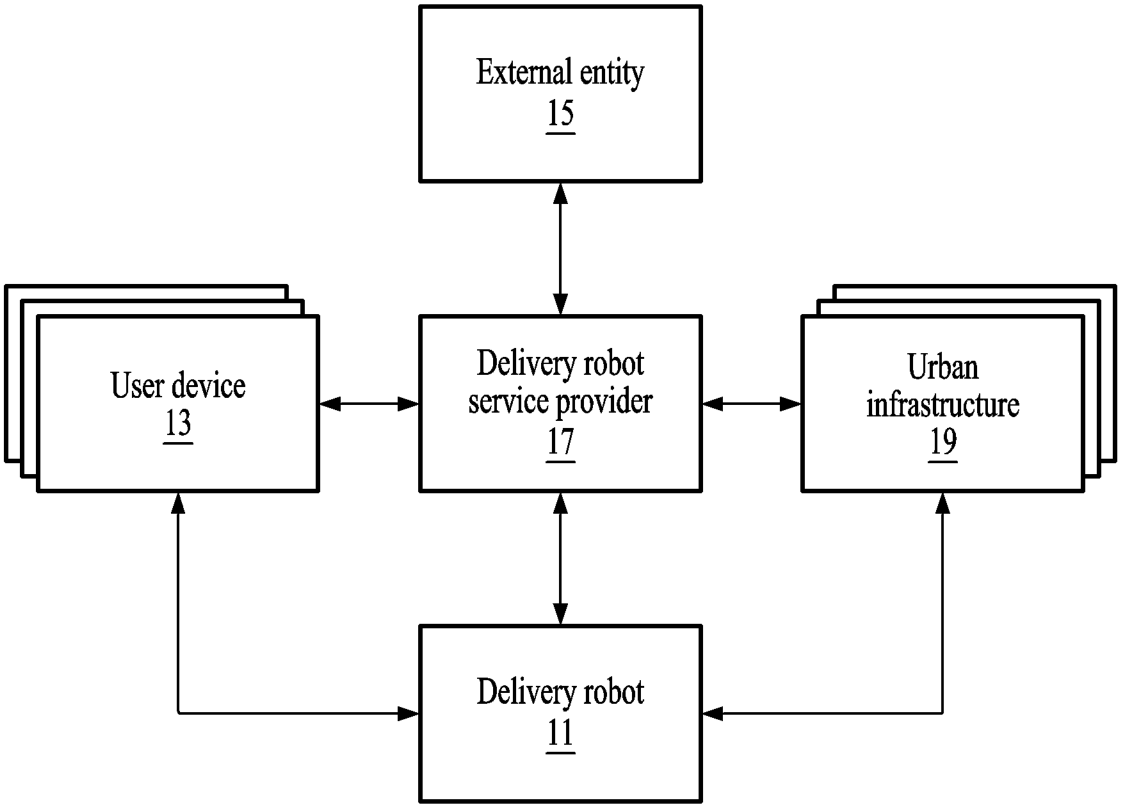

FIGS. 1 and 2 are diagrams each illustrating a delivery robot service system according to an embodiment.

Referring to FIGS. 1 and 2, according to an embodiment, a delivery robot service system 10 may include a delivery robot 11, a user device 13, an external entity 15, a delivery robot service provider 17, and urban infrastructure 19.

The delivery robot 11 may deliver goods based on a delivery request of a user. The delivery robot 11 may include an autonomous driving-based robot. The delivery robot 11 may directly interwork with the user device 13, the delivery robot service provider 17, and the urban infrastructure 19. The delivery robot 11 may indirectly interwork with the external entity 15 through the delivery robot service provider 17.

The delivery robot 11 may share information (e.g., identifiers or capabilities) on the delivery robot 11 with the delivery robot service provider 17.

The delivery robot 11 may share delivery status information (e.g., a current location of the delivery robot 11, a loading status of the goods, the type of the goods, or a status of the goods) with the delivery robot service provider 17.

The delivery robot 11 may identify at least one user device related to the goods to be delivered. For example, the delivery robot 11 may identify a user device related to the loading of the goods and a user device (e.g., a user device of a recipient) related to the unloading of the goods.

When the goods are loaded or unloaded by an object (e.g., a person or another robot) that is not the delivery robot 11, the delivery robot 11 may notify the delivery robot service provider 17 that the delivery robot 11 is waiting for the loading or unloading of the goods after arriving at a loading location or an unloading location.

The delivery robot 11 may receive information indicating that the loading or the unloading is completed from the object (e.g., the person or the other robot) responsible for the loading or unloading of the goods. After receiving the information, the delivery robot 11 may notify the delivery robot service provider 17 that the loading or the unloading is completed.

When the goods are loaded or unloaded by the delivery robot 11, the delivery robot 11 may notify the delivery robot service provider 17 that the loading or the unloading is completed after completing the loading or unloading of the goods.

After arriving at the urban infrastructure 19, the delivery robot 11 may notify the delivery robot service provider 17 that the delivery robot 11 is waiting to access the urban infrastructure 19.

The delivery robot 11 may request the delivery robot service provider 17 to transmit additional information required to access the urban infrastructure 19 or for autonomous driving.

The delivery robot 11 may maintain time synchronization with the delivery robot service provider 17.

When an event (e.g., the breakdown of the delivery robot 11) that may impede delivery occurs, the delivery robot 11 may notify the delivery robot service provider 17 of information related to the event. The delivery robot 11 may take actions necessary to resolve the event.

The delivery robot 11 may directly interwork with the user device 13, the urban infrastructure 19, and another delivery robot (e.g., another delivery robot 21 of FIG. 10), as needed. For example, the delivery robot 11 may directly interwork with the other delivery robot 21 when a collision with the other delivery robot 21 that is within a preset distance (or a distance sensible by a sensor) from the delivery robot 11 is predicted. The delivery robot 11 may directly interwork with the other delivery robot 21 when congestion caused due to the sharing of a narrow space (e.g., a staircase) between the delivery robot 11 and the other delivery robot 21 is predicted. The delivery robot 11 may calculate a congestion level based on at least one of an area of a space surrounding the delivery robot 11, the type of the space surrounding the delivery robot 11, the size of the delivery robot 11, and the size of the other delivery robot 21. For example, the delivery robot 11 may determine the congestion level to be higher as a probability that the space (e.g., an elevator) surrounding the delivery robot 11 may be occupied by a person increases. The delivery robot 11 may directly interwork with the other delivery robot 21 when the congestion level satisfies a threshold value. The delivery robot 11 may directly interwork with the urban infrastructure 19 when communication with the delivery robot service provider 17 fails. The delivery robot 11 may directly interwork with the user device 13 when the delivery robot 11 needs to move to a location in proximity to the user device 13, or user authentication is required.

The delivery robot 11 may notify the delivery robot service provider 17 of a result of direct interworking.

The delivery robot 11 may interwork with the other delivery robot 21 through the delivery robot service provider 17.

The delivery robot 11 may receive a request to preferentially process a certain task from the delivery robot service provider 17. The delivery robot 11 may preferentially process the requested task. The delivery robot 11 may transmit a result of processing the requested task to the delivery robot service provider 17.

The user device 13 may include at least one device. For example, the user device 13 may include at least one of a device of a delivery requester, a device related to the loading of the goods, and a device related to the unloading of the goods. The device may include an electronic device, such as a mobile device or a computing device, that is operated by the user and/or an unattended electronic device that may store and/or manage the goods. The user device 13 may directly interwork with the delivery robot service provider 17 and the delivery robot 11.

The user device 13 may provide a function (e.g., a user interface) of receiving a delivery request from the user and providing the user with delivery status information.

The user device 13 may transmit delivery information input by the user to the delivery robot service provider 17.

The user device 13 may collect the location information of the user device 13.

When receiving information that needs to be confirmed or processed by the user, the user device 13 may notify the user of the reception of the information by using various means (e.g., sound, vibration, or light).

The user device 13 may directly interwork with the delivery robot 11 that is located near the user device 13. For example, the user device 13 may directly interwork with the delivery robot 11 when the delivery robot 11 is within a preset distance from the user device 13.

When receiving a request for the loading or unloading of the goods from the delivery robot service provider 17, the user device 13 may notify the user (e.g., a person in charge of loading or a recipient) of the reception of the request.

The user device 13 may notify the delivery robot service provider 17 that the loading or unloading of the goods is completed.

The external entity 15 may include a device (e.g., a server) of a public institution (e.g., an urban control center, a disaster management agency, or an emergency rescue agency) and a device (e.g., a server) of another delivery robot service provider. The external entity 15 may directly interwork with the delivery robot service provider 17.

The delivery robot service provider 17 may include a device, such as a server. The delivery robot service provider 17 may manage the delivery robot 11. The delivery robot service provider 17 may directly interwork with the delivery robot 11, the user device 13, the external entity 15, and the urban infrastructure 19.

The delivery robot service provider 17 may retain and/or manage the information (e.g., the identifiers or the capabilities) on the delivery robot 11.

The delivery robot service provider 17 may collect and manage information (e.g., locations, identifiers, or capabilities) on the urban infrastructure 19.

The delivery robot service provider 17 may determine whether there is an available delivery robot (e.g., the delivery robot 11) in response to receiving a delivery request from the user device 13. The delivery robot service provider 17 may transmit information (e.g., delivery request approval or delivery request rejection) to the user device 13, based on the available delivery robot.

The delivery robot service provider 17 may identify at least one user device related to the received delivery request. For example, the delivery robot service provider 17 may identify a user device of the delivery requester, the user device related to the loading of the goods, and the user device (e.g., the user device of the recipient) related to the unloading of the goods.

The delivery robot service provider 17 may generate delivery information on the delivery request. The delivery information may include at least one of a pick-up location, a delivery location, a delivery time, information (e.g., a location or an identifier) on infrastructure that needs to interwork with a delivery robot, a delivery route, the type of goods, the weight of the goods, the size of the goods, and a delivery condition (e.g., a proper temperature).

The delivery robot service provider 17 may assign the delivery robot 11 simultaneously with or separately from generating a delivery request.

The delivery robot service provider 17 may collect a current location of the delivery robot 11, a movement direction of the delivery robot 11, a status (e.g., breakdown or a battery status) of the delivery robot 11, a goods loading status of the delivery robot 11, or a status (e.g., a temperature) of the goods.

The delivery robot service provider 17 may transmit delivery status information generated by the delivery robot 11 to the user device 13.

The delivery robot service provider 17 should notify the user device 13 that the delivery robot 11 is waiting to load or unload the goods after the delivery robot 11 arrives at the pick-up location or the delivery location.

The delivery robot service provider 17 should notify the urban infrastructure 19 that the delivery robot 11 is waiting to interwork with the urban infrastructure 19 after the delivery robot 11 arrives at the urban infrastructure 19.

The delivery robot service provider 17 should notify the delivery robot 11 of a response (e.g., a result of an interworking request), which is received from the urban infrastructure 19, to the interworking request.

The delivery robot service provider 17 may collect additional information other than the delivery information from the urban infrastructure 19 and/or the external entity 15. The delivery robot service provider 17 may provide the collected additional information to the delivery robot 11.

The delivery robot service provider 17 may receive information indicating the loading or unloading of the goods is completed from the user device 13. The delivery robot service provider 17 may transmit the received information to the delivery robot 11.

The delivery robot service provider 17 may receive information indicating that the loading or unloading of the goods is completed from the delivery robot 11. The delivery robot service provider 17 may transmit the received information to the user device 13.

The delivery robot service provider 17 may determine whether the delivery robot 11 may continue to deliver the goods, based on the delivery status information generated by the delivery robot 11.

The delivery robot service provider 17 may receive a result of direct interworking from the delivery robot 11. The delivery robot service provider 17 may update the delivery information in response to receiving the result.

The delivery robot service provider 17 may receive a request from the external entity 15. For example, the external entity 15 may request the delivery robot service provider 17 to transmit visual information on a space surrounding the delivery robot 11. The delivery robot service provider 17 may evaluate (or determine) the request (e.g., the content of the request) from the external entity 15. The delivery robot service provider 17 may divide the request from the external entity 15 into an urgent request and a non-urgent request. The delivery robot service provider 17 may notify the delivery robot 11 of the request from the external entity 15. For example, when the request from the external entity 15 needs to be processed preferentially, the delivery robot service provider 17 may transmit priority information of the request together with the request from the external entity 15 to the delivery robot 11.

The delivery robot service provider 17 may process the request from the external entity 15 and may notify the external entity 15 of a processing result.

The delivery robot service provider 17 may determine a priority among a plurality of delivery robots when the plurality of delivery robots is waiting to interwork with the same urban infrastructure. The priority may be an order for the plurality of delivery robots to use the urban infrastructure. The delivery robot service provider 17 may use the delivery status information (e.g., the type of goods or a status of the goods) of each of the plurality of delivery robots to determine the priority.

The delivery robot service provider 17 may receive a result of the interworking (e.g., direct interworking) between the delivery robot 11 and another delivery robot (e.g., the other delivery robot 21) from the delivery robot 11. The delivery robot service provider 17 may determine, from the received result, that the other delivery robot 21 is managed by another delivery service provider (e.g., another delivery service provider 35 of FIG. 10). The delivery robot service provider 17 may determine, from the received result, that the delivery robot 11 and the other delivery robot 21 are waiting to interwork with the same urban infrastructure. The delivery robot service provider 17 may interwork with the other delivery robot service provider 35 to coordinate the priority between the delivery robot 11 and the other delivery robot 21.

The delivery robot service provider 17 may transform a certain coordinate system (e.g., a cartesian coordinate system) into another coordinate system (e.g., a spherical coordinate system). The delivery robot service provider 17 may identify the current location of the delivery robot 11 by using an appropriate coordinate system. The delivery robot service provider 17 may use the appropriate coordinate system to assist with an operation (e.g., the loading and unloading of the goods or the access to the urban infrastructure 19) of the delivery robot 11. The delivery robot service provider 17 may use the appropriate coordinate system to exchange information with the other delivery robot service provider 35.

The urban infrastructure 19 may include facilities (e.g., elevators, gates, communal entrances, or electric charging stations) that need to be used, accessed, and/or passed by the delivery robot 11 to deliver the goods. The urban infrastructure 19 herein may be a device (e.g., a server) that manages the urban infrastructure 19. The urban infrastructure 19 may directly interwork with the delivery robot 11 and the delivery robot service provider 17.

The urban infrastructure 19 may share the information (e.g., the identifiers, the capacities, or the locations) on the urban infrastructure 19 with the delivery robot service provider 17.

The urban infrastructure 19 may notify the delivery robot service provider 17 whether the access of the delivery robot 11 is approved.

The urban infrastructure 19 may request the delivery robot service provider 17 to transmit information on the goods loaded on the delivery robot 11.

The urban infrastructure 19 may directly interwork with the delivery robot service provider 17. The urban infrastructure 19 may interwork with the delivery robot service provider 17 through another system (e.g., a building management system or an external infrastructure management service system).

The urban infrastructure 19 may directly interwork with the delivery robot 11 near the urban infrastructure 19.

The urban infrastructure 19 may provide the delivery robot service provider 17 with the information (e.g., service status, availability, breakdown, or inspection) on the urban infrastructure 19 in response to a request from the delivery robot service provider 17.

The delivery robot service system 10 may include data security means (e.g., communication encryption) for interworking.

The delivery robot service system 10 may include means to prevent data forgery for interworking.

The delivery robot service system 10 may include means to prevent the leakage of the personal information of the user and the location information of the user.

Figure 3:
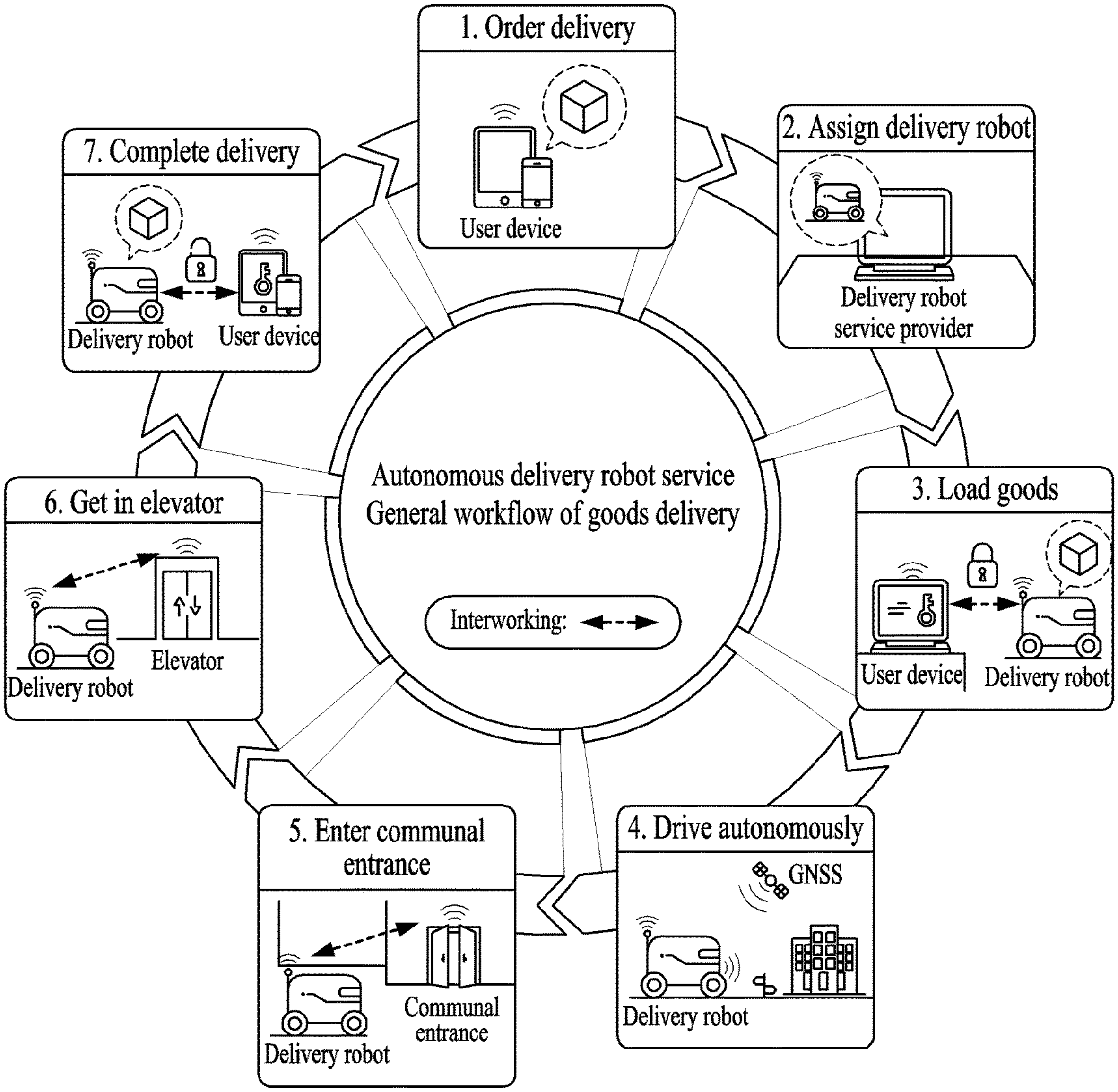
FIG. 3 is a schematic flowchart illustrating a delivery robot service according to an embodiment.

FIG. 3 is a schematic flowchart illustrating a workflow of a delivery robot service according to an embodiment.

Referring to FIG. 3, according to an embodiment, a user device (e.g., the user device 13 of FIG. 1) may transmit a delivery request from a user to a delivery robot service provider (e.g., the delivery robot service provider 17 of FIG. 1).

The delivery robot service provider 17 may confirm the delivery request and may assign a delivery robot (e.g., the delivery robot 11 of FIG. 1) in charge of delivery.

The delivery robot 11 may move to a pick-up location of goods through autonomous driving. The delivery robot 11 may interwork with the user device 13 to load the goods.

The delivery robot 11 may move to a destination (e.g., a delivery location) together with the loaded goods through autonomous driving.

The delivery robot 11 may interwork with urban infrastructure (e.g., the urban infrastructure 19 of FIG. 1) located on a delivery route. For example, the delivery robot 11 may communicate with the management systems (e.g., servers) of communal entrances and elevators to use the communal entrances and the elevators.

After arriving at the destination, the delivery robot 11 may unload the goods. To unload the goods, the delivery robot 11 may interwork with the user device 13.

Figure 4:
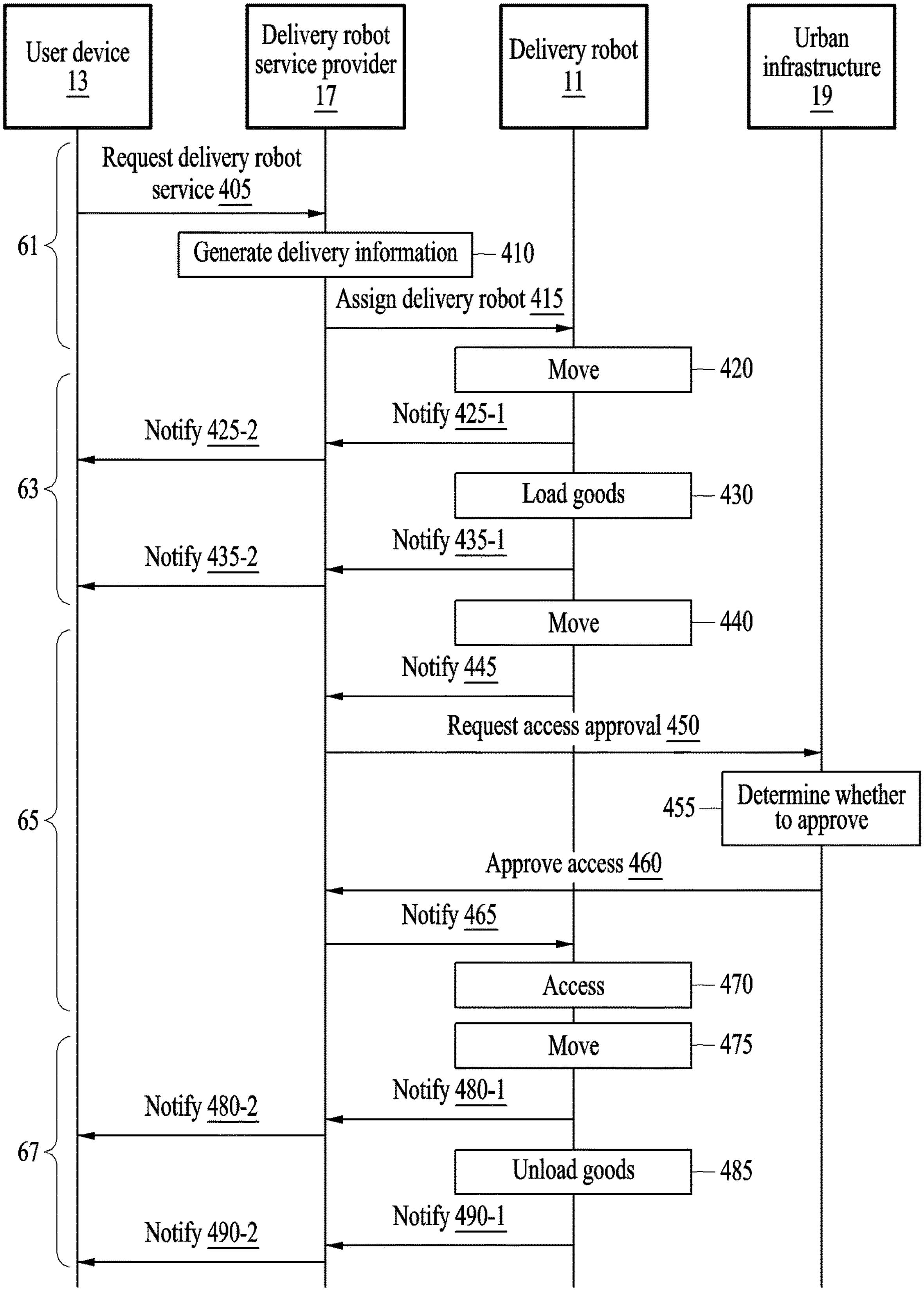
FIG. 4 is a flowchart illustrating the delivery robot service system according to an embodiment.

FIG. 4 is a flowchart illustrating the delivery robot service system according to an embodiment.

Referring to FIG. 4, according to an embodiment, a delivery process may include a delivery request phase 61, a loading phase 63, an infrastructure access phase 65, and an unloading phase 67. However, the infrastructure access phase 65 may be omitted depending on a delivery route or may be added between the delivery request phase 61 and the loading phase 63. Operations 405 to 490-2 may be performed sequentially, but examples are not limited thereto. For example, one or more operations may be omitted or added, or two or more operations may be performed in parallel.

In operation 405, the user device 13 (e.g., a device of a delivery requester) may transmit a delivery request to the delivery robot service provider 17. The delivery robot service provider 17 may receive the delivery request and may determine whether there is an available delivery robot. The delivery robot service provider 17 may transmit delivery request approval to the user device 13 when there is an available delivery robot (e.g., the delivery robot 11).

In operation 410, the delivery robot service provider 17 may generate delivery information on the approved delivery request. The delivery information may include at least one of a pick-up location, a delivery location, a delivery time, information (e.g., a location or an identifier) on infrastructure that needs to interwork with a delivery robot, a delivery route, the type of goods, the weight of the goods, the size of the goods, and a delivery condition (e.g., a proper temperature).

In operation 415, the delivery robot service provider 17 may assign the delivery robot 11 to perform the approved delivery request.

In operation 420, the delivery robot 11 may move to a pick-up location of goods through autonomous driving.

In operation 425-1, the delivery robot 11 may notify the delivery robot service provider 17 that the delivery robot 11 is waiting to load the goods after arriving at the pick-up location.

In operation 425-2, the delivery robot service provider 17 may notify the user device 13 (e.g., a robot or a device of a person who manages the loading) that the delivery robot 11 is waiting for the loading of the goods.

In operation 430, the delivery robot 11 may load the goods.

In operation 435-1, the delivery robot 11 may notify the delivery robot service provider 17 that the loading of the goods is completed.

In operation 435-2, the delivery robot service provider 17 may notify the user device 13 that the loading of the goods is completed.

In operation 440, the delivery robot 11 may move to a delivery location (e.g., a destination) through autonomous driving.

In operation 445, the delivery robot 11 may notify the delivery robot service provider 17 that the delivery robot 11 is waiting to access the urban infrastructure 19 when the delivery robot 11 arrives at the urban infrastructure 19 located on the delivery route.

In operation 450, the delivery robot service provider 17 may transmit an access approval request to the urban infrastructure 19.

In operation 455, the urban infrastructure 19 may determine whether to approve access.

In operation 460, the urban infrastructure 19 may notify the delivery robot service provider 17 that the access is approved.

In operation 465, the delivery robot service provider 17 may notify the delivery robot 11 that the access is approved.

In operation 470, the delivery robot 11 may access the urban infrastructure 19. For example, the delivery robot 11 may get in an elevator or pass a communal entrance.

In operation 475, the delivery robot 11 may move to the delivery location (e.g., the destination) through autonomous driving.

In operation 480-1, the delivery robot 11 may notify the delivery robot service provider 17 that the delivery robot 11 is waiting to unload the goods after the delivery robot 11 arrives at the delivery location.

In operation 480-2, the delivery robot service provider 17 may notify the user device 13 (e.g., a robot or a device of a recipient) that the delivery robot 11 is waiting for the unloading of the goods.

In operation 485, the delivery robot 11 may unload the goods.

In operation 490-1, the delivery robot 11 may notify the delivery robot service provider 17 that the unloading of the goods is completed.

In operation 490-2, the delivery robot service provider 17 may notify the user device 13 that the unloading of the goods is completed.

Figure 5:
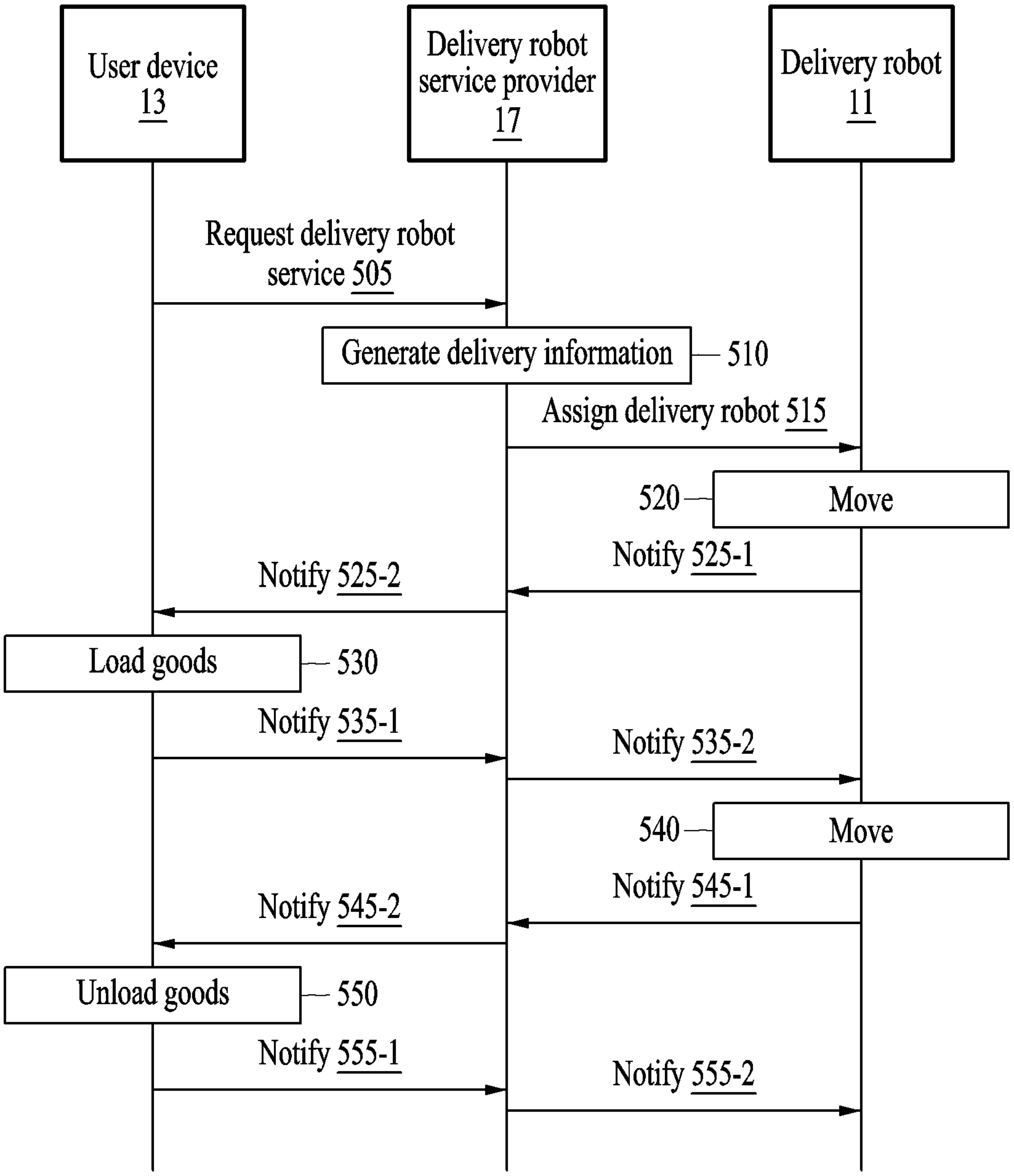
FIG. 5 is a flowchart illustrating loading and unloading of goods according to an embodiment.

FIG. 5 is a flowchart illustrating loading and unloading of goods according to an embodiment. FIG. 5 may be a flowchart illustrating a process where the goods are loaded or unloaded by another object (e.g., a person or another robot) that is not the delivery robot 11.

Referring to FIG. 5, according to an embodiment, operations 505 to 555-2 may be performed sequentially, but examples are not limited thereto. For example, one or more operations may be omitted or added, or two or more operations may be performed in parallel.

In operation 505, the user device 13 (e.g., a device of a delivery requester) may transmit a delivery request to the delivery robot service provider 17. The delivery robot service provider 17 may receive the delivery request and may determine whether there is an available delivery robot. The delivery robot service provider 17 may transmit delivery request approval to the user device 13 when there is an available delivery robot (e.g., the delivery robot 11).

In operation 510, the delivery robot service provider 17 may generate delivery information on the approved delivery request. The delivery information may include at least one of a pick-up location, a delivery location, a delivery time, information (e.g., a location or an identifier) on infrastructure that needs to interwork with a delivery robot, a delivery route, the type of goods, the weight of the goods, the size of the goods, and a delivery condition (e.g., a proper temperature).

In operation 515, the delivery robot service provider 17 may assign the delivery robot 11 to perform the approved delivery request.

In operation 520, the delivery robot 11 may move to a pick-up location of goods through autonomous driving.

In operation 525-1, the delivery robot 11 may notify the delivery robot service provider 17 that the delivery robot 11 is waiting to load the goods after arriving at the pick-up location.

In operation 525-2, the delivery robot service provider 17 may notify the user device 13 that the delivery robot 11 is waiting for the loading of the goods.

In operation 530, an object (e.g., a person or another robot) at the pick-up location may load the goods on the delivery robot 11.

In operation 535-1, the user device 13 may notify the delivery robot service provider 17 that the loading of the goods is completed.

In operation 535-2, the delivery robot service provider 17 may notify the delivery robot 11 that the loading of the goods is completed.

In operation 540, the delivery robot 11 may move to the delivery location (e.g., a destination) through autonomous driving.

In operation 545-1, the delivery robot 11 may notify the delivery robot service provider 17 that the delivery robot 11 is waiting to unload the goods after arriving at the delivery location.

In operation 545-2, the delivery robot service provider 17 may notify the user device 13 that the delivery robot 11 is waiting for the unloading of the goods.

In operation 550, an object (e.g., a person or another robot) at the delivery location may unload the goods from the delivery robot 11.

In operation 555-1, the user device 13 may notify the delivery robot service provider 17 that the unloading of the goods is completed.

In operation 555-2, the delivery robot service provider 17 may notify the delivery robot 11 that the unloading of the goods is completed.

Figure 6:
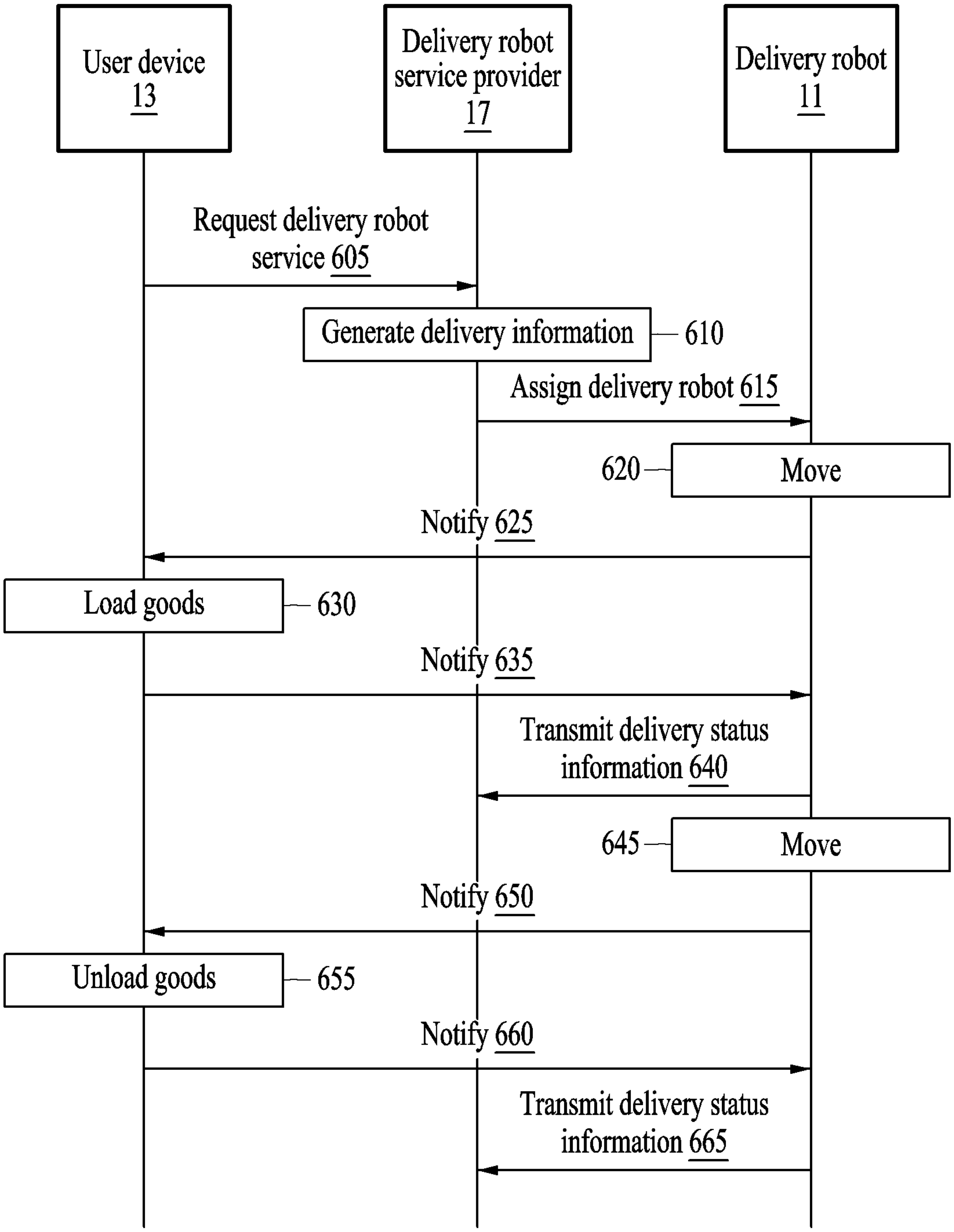
FIG. 6 is another flowchart illustrating the loading and unloading of goods according to an embodiment.

FIG. 6 is another flowchart illustrating the loading and unloading of goods according to an embodiment. FIG. 6 may be a flowchart illustrating a process when the delivery robot 11 directly interworks with the user device 13 for the loading and unloading of the goods.

Referring to FIG. 6, according to an embodiment, operations 605 to 665 may be performed sequentially, but examples are not limited thereto. For example, one or more operations may be omitted or added, or two or more operations may be performed in parallel.

In operation 605, the user device 13 (e.g., a device of a delivery requester) may transmit a delivery request to the delivery robot service provider 17. The delivery robot service provider 17 may receive the delivery request and may determine whether there is an available delivery robot. The delivery robot service provider 17 may transmit delivery request approval to the user device 13 when there is an available delivery robot (e.g., the delivery robot 11).

In operation 610, the delivery robot service provider 17 may generate delivery information on the approved delivery request. The delivery information may include at least one of a pick-up location, a delivery location, a delivery time, information (e.g., a location or an identifier) on infrastructure that needs to interwork with a delivery robot, a delivery route, the type of goods, the weight of the goods, the size of the goods, and a delivery condition (e.g., a proper temperature).

In operation 615, the delivery robot service provider 17 may assign the delivery robot 11 to perform the approved delivery request.

In operation 620, the delivery robot 11 may move to a pick-up location of goods through autonomous driving.

In operation 625, the delivery robot 11 may notify the user device 13 that the delivery robot 11 is waiting to load the goods after arriving at the pick-up location.

In operation 630, an object (e.g., a person or another robot) at the pick-up location may load the goods on the delivery robot 11.

In operation 635, the user device 13 may notify the delivery robot 11 that the loading of the goods is completed.

In operation 640, the delivery robot 11 may update delivery status information and transmit the updated delivery status information (e.g., a loading status of the goods) to the delivery robot service provider 17.

In operation 645, the delivery robot 11 may move to a delivery location of the goods through autonomous driving.

In operation 650, the delivery robot 11 may notify the user device 13 that the delivery robot 11 is waiting for the unloading of the goods.

In operation 650, an object (e.g., a person or another robot) at the delivery location may unload the goods from the delivery robot 11.

In operation 660, the user device 13 may notify the delivery robot 11 that the unloading of the goods is completed.

In operation 665, the delivery robot 11 may update the delivery status information and transmit the updated delivery status information (e.g., the loading status of the goods) to the delivery robot service provider 17.

Figure 7:
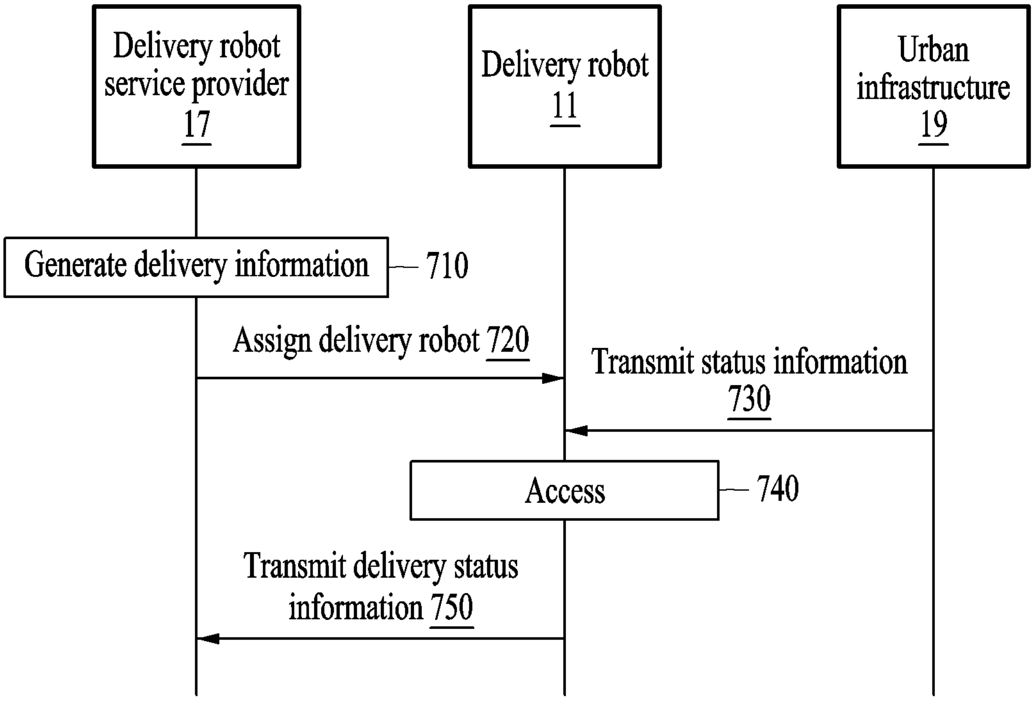
FIG. 7 is a flowchart illustrating interworking with infrastructure according to an embodiment.

FIG. 7 is a flowchart illustrating interworking with infrastructure according to an embodiment. FIG. 7 may be a flowchart illustrating a process when the delivery robot 11 may access the urban infrastructure 19 without approval from the urban infrastructure 19.

Referring to FIG. 7, according to an embodiment, operations 710 to 750 may be performed sequentially, but examples are not limited thereto. For example, one or more operations may be omitted or added, or two or more operations may be performed in parallel.

In operation 710, the delivery robot service provider 17 may generate delivery information on an approved delivery request. The delivery information may include at least one of a pick-up location, a delivery location, a delivery time, information (e.g., a location or an identifier) on infrastructure that needs to interwork with a delivery robot, a delivery route, the type of goods, the weight of the goods, the size of the goods, and a delivery condition (e.g., a proper temperature).

In operation 720, the delivery robot service provider 17 may assign the delivery robot 11 to perform the approved delivery request.

In operation 730, the urban infrastructure 19 may transmit the status information (e.g., capability or availability) of the urban infrastructure 19 to the delivery robot 11 that arrives at a space near the urban infrastructure 19.

In operation 740, the delivery robot 11 may access the urban infrastructure 19.

In operation 750, the delivery robot 11 may update delivery status information and transmit the updated delivery status information to the delivery robot service provider 17. For example, the delivery robot 11 may notify the delivery robot service provider 17 that the delivery robot 11 passes the urban infrastructure 19.

Figure 8:
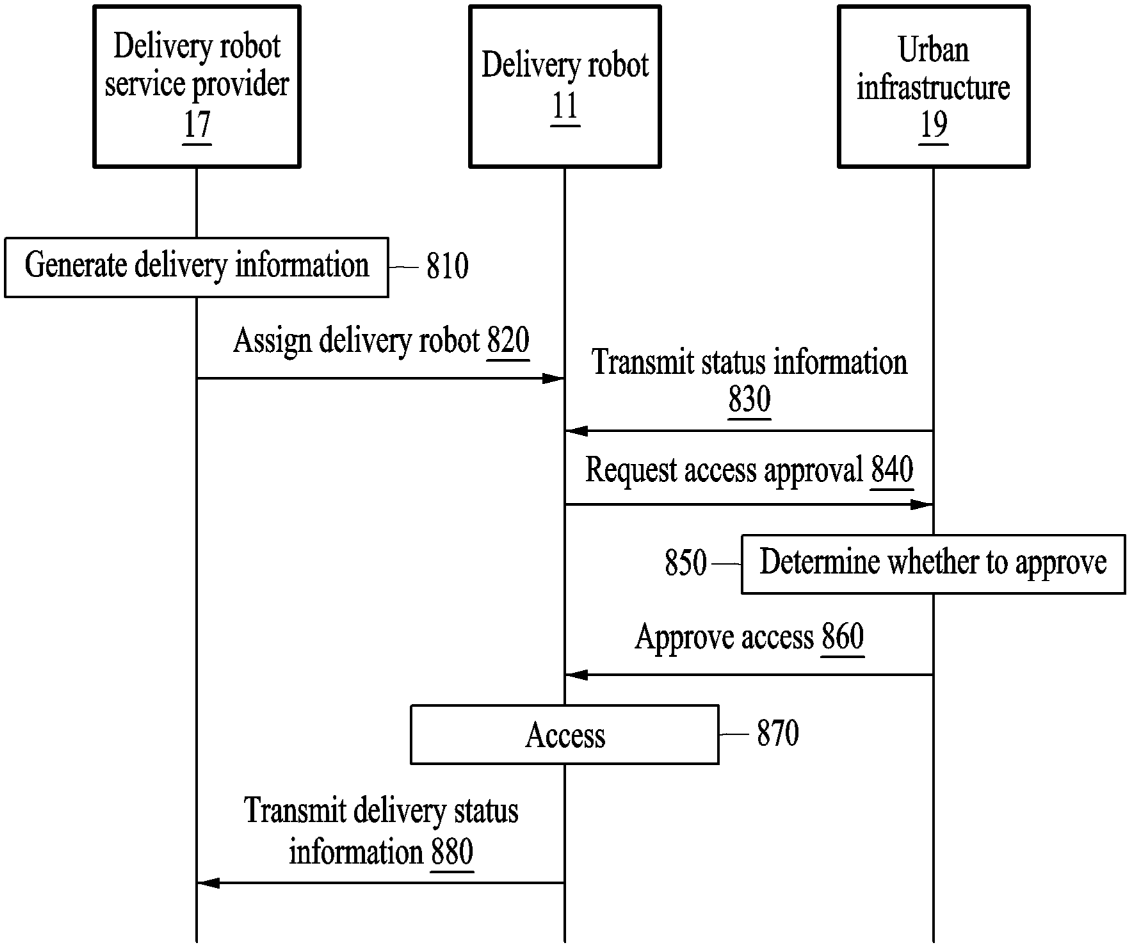
FIG. 8 is another flowchart illustrating the interworking with infrastructure according to an embodiment.

FIG. 8 is another flowchart illustrating the interworking with infrastructure according to an embodiment. FIG. 8 may be a flowchart illustrating a process when the delivery robot 11 directly interworks with the urban infrastructure 19.

Referring to FIG. 8, according to an embodiment, operations 810 to 880 may be performed sequentially, but examples are not limited thereto. For example, one or more operations may be omitted or added, or two or more operations may be performed in parallel.

In operation 810, the delivery robot service provider 17 may generate delivery information on an approved delivery request. The delivery information may include at least one of a pick-up location, a delivery location, a delivery time, information (e.g., a location or an identifier) on infrastructure that needs to interwork with a delivery robot, a delivery route, the type of goods, the weight of the goods, the size of the goods, and a delivery condition (e.g., a proper temperature).

In operation 820, the delivery robot service provider 17 may assign the delivery robot 11 to perform the approved delivery request.

In operation 830, the urban infrastructure 19 may transmit the status information (e.g., capability or availability) of the urban infrastructure 19 to the delivery robot 11 that arrives at a space near the urban infrastructure 19.

In operation 840, the delivery robot 11 may transmit an access approval request to the urban infrastructure 19.

In operation 850, the urban infrastructure 19 may determine whether to approve access.

In operation 860, the urban infrastructure 19 may notify the delivery robot 11 that the access is approved.

In operation 870, the delivery robot 11 may access the urban infrastructure 19.

In operation 880, the delivery robot 11 may update delivery status information and transmit the updated delivery status information to the delivery robot service provider 17. For example, the delivery robot 11 may notify the delivery robot service provider 17 that the delivery robot 11 passes the urban infrastructure 19.

Figure 9:
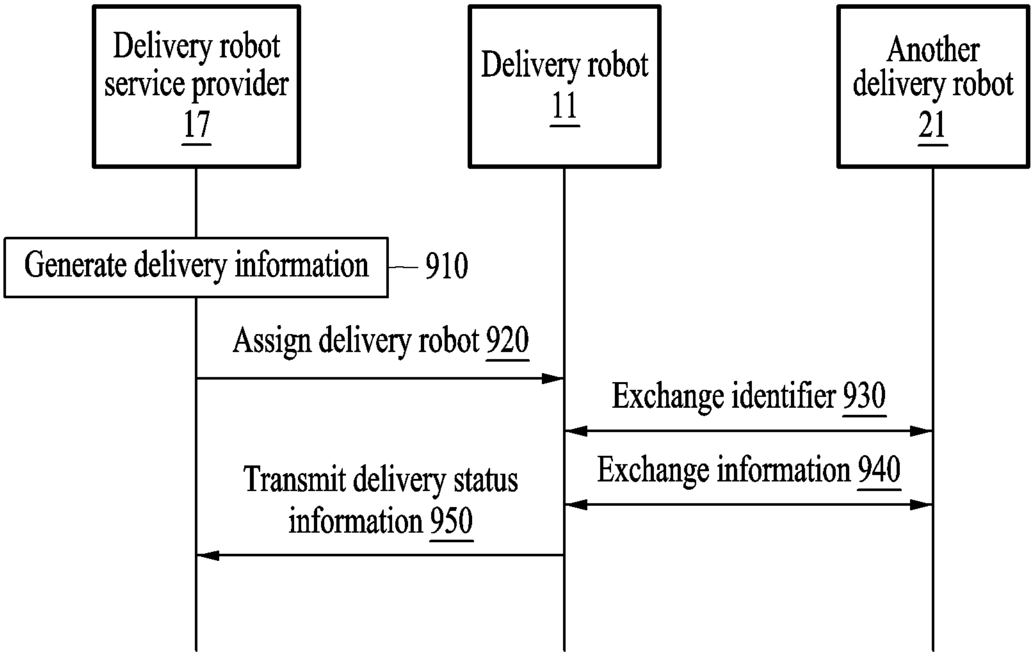
FIG. 9 is a flowchart illustrating interworking between delivery robots according to an embodiment.

FIG. 9 is a flowchart illustrating interworking between delivery robots according to an embodiment. FIG. 9 may be a flowchart illustrating a process when the delivery robot 11 directly interworks with the other delivery robot 21.

Referring to FIG. 9, according to an embodiment, operations 910 to 950 may be performed sequentially, but examples are not limited thereto. For example, one or more operations may be omitted or added, or two or more operations may be performed in parallel.

In operation 910, the delivery robot service provider 17 may generate delivery information on an approved delivery request. The delivery information may include at least one of a pick-up location, a delivery location, a delivery time, information (e.g., a location or an identifier) on infrastructure that needs to interwork with a delivery robot, a delivery route, the type of goods, the weight of the goods, the size of the goods, and a delivery condition (e.g., a proper temperature).

In operation 920, the delivery robot service provider 17 may assign the delivery robot 11 to perform the approved delivery request.

In operation 930, the delivery robot 11 may detect the other delivery robot 21 approaching the delivery robot 11. The delivery robot 11 may transmit an identifier of the delivery robot 11 to the other delivery robot 21. The delivery robot 11 may receive an identifier of the other delivery robot 21 from the other delivery robot 21.

In operation 940, the delivery robot 11 may exchange information with the other delivery robot 21. For example, information on delivery robot service providers that manage the delivery robots 11 and 21 respectively, and the delivery status information of each of the delivery robots 11 and 21 may be exchanged.

In operation 950, the delivery robot 11 may update the delivery status information based on the identifier and information received from the other delivery robot 21 and may transmit the updated delivery status information to the delivery robot service provider 17.

Figure 10:
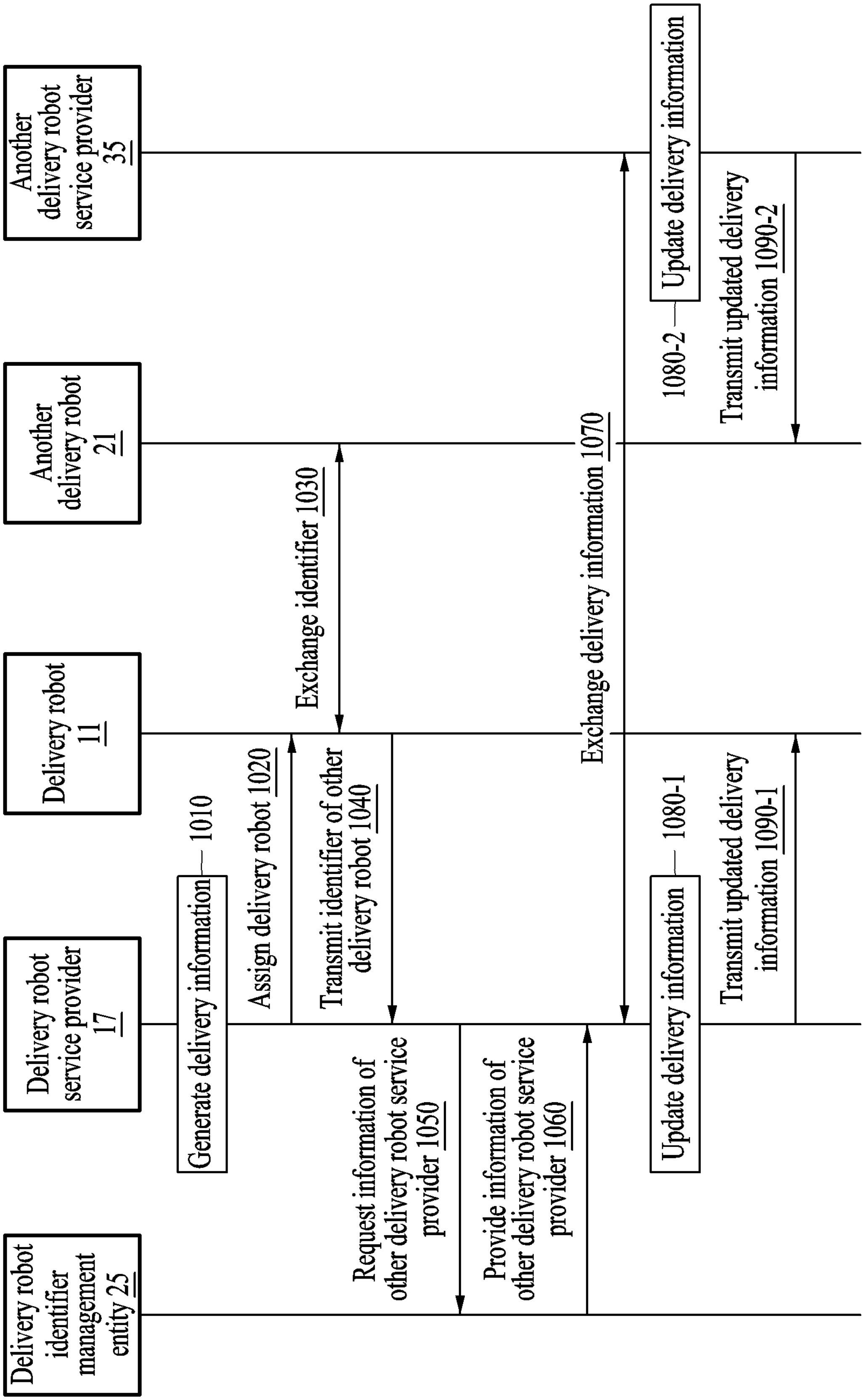
FIG. 10 is another flowchart illustrating the interworking between delivery robots according to an embodiment.

FIG. 10 is another flowchart illustrating the interworking between delivery robots according to an embodiment. FIG. 10 may be a flowchart illustrating an interworking process between the delivery robot service provider 17 and the other delivery robot service provider 35. Referring to FIG. 10, the delivery robot 11 may be managed by the delivery robot service provider 17, and the other delivery robot 21 may be managed by the other delivery robot service provider 35.

Referring to FIG. 10, according to an embodiment, operations 1010 to 1090-2 may be performed sequentially, but examples are not limited thereto. For example, one or more operations may be omitted or added, or two or more operations may be performed in parallel.

In operation 1010, the delivery robot service provider 17 may generate delivery information on an approved delivery request. The delivery information may include at least one of a pick-up location, a delivery location, a delivery time, information (e.g., a location or an identifier) on infrastructure that needs to interwork with a delivery robot, a delivery route, the type of goods, the weight of the goods, the size of the goods, and a delivery condition (e.g., a proper temperature).

In operation 1020, the delivery robot service provider 17 may assign the delivery robot 11 to perform the approved delivery request.

In operation 1030, the delivery robot 11 may detect the other delivery robot 21 approaching the delivery robot 11. The delivery robot 11 may transmit an identifier of the delivery robot 11 to the other delivery robot 21. The delivery robot 11 may receive an identifier of the other delivery robot 21 from the other delivery robot 21.

In operation 1040, the delivery robot 11 may transmit the identifier of the other delivery robot 21 to the delivery robot service provider 17.

In operation 1050, the delivery robot service provider 17 may transmit the identifier of the other delivery robot 21 to a delivery robot identifier management entity 25 (e.g., an external entity). The delivery robot service provider 17 may request information on the other delivery robot service provider 35.

In operation 1060, the delivery robot identifier management entity 25 may provide the delivery robot service provider 17 with information (e.g., an internet protocol (IP) of the other delivery robot service provider 35) that is required for the delivery robot service provider 17 to interwork with the other delivery robot service provider 35.

In operation 1070, the delivery robot service provider 17 may transmit the delivery information of the delivery robot 11 to the other delivery robot service provider 35. The delivery robot service provider 17 may receive the delivery information of the other delivery robot 21 from the other delivery robot service provider 35. For example, the delivery robot service providers 17 and 35 may exchange delivery information to determine an access priority of the delivery robots 11 and 21 to the urban infrastructure 19.

In operation 1080-1, the delivery robot service provider 17 may update the delivery information of the delivery robot 11.

In operation 1080-2, the other delivery robot service provider 35 may update the delivery information of the other delivery robot 21.

In operation 1090-1, the delivery robot service provider 17 may transmit the updated delivery information to the delivery robot 11.

In operation 1090-2, the other delivery robot service provider 35 may transmit the updated delivery information to the other delivery robot 21.

Figure 11:
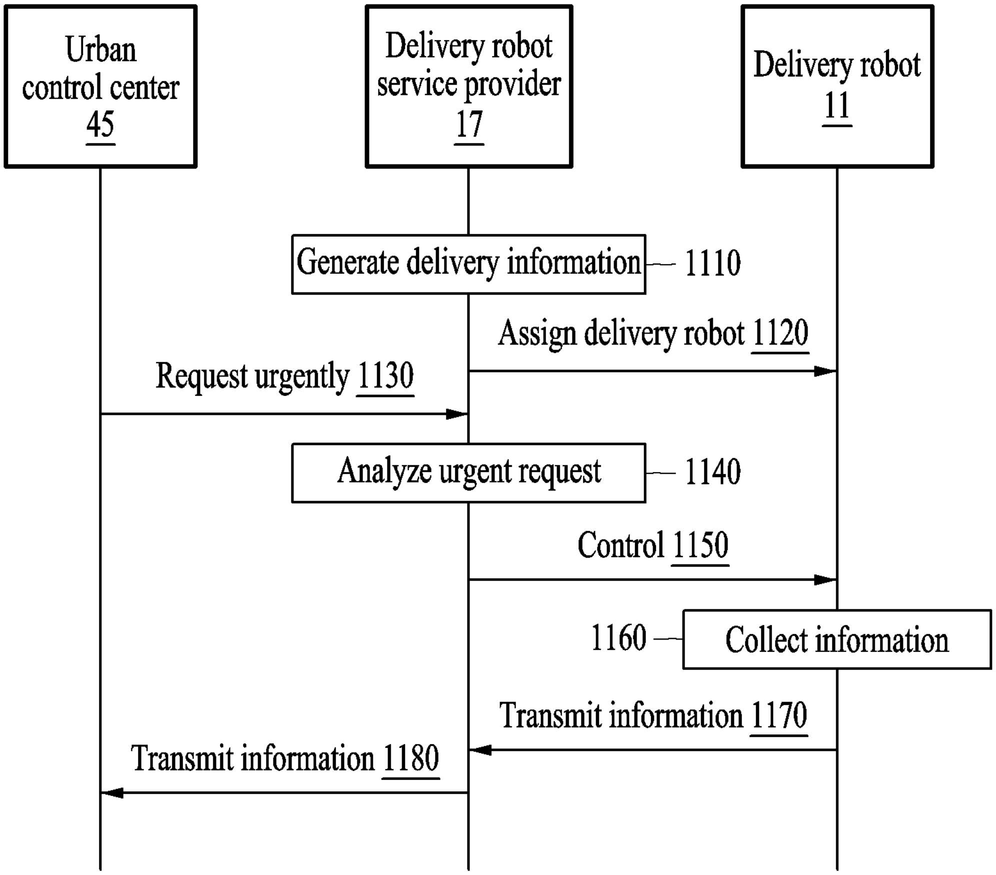
FIG. 11 is a flowchart illustrating interworking with an external entity according to an embodiment.

FIG. 11 is a flowchart illustrating interworking with an external entity according to an embodiment. FIG. 11 may be a flowchart illustrating interworking with the external entity (e.g., a public agency), such as an urban control center 45.

Referring to FIG. 11, according to an embodiment, operations 1110 to 1180 may be performed sequentially, but examples are not limited thereto. For example, one or more operations may be omitted or added, or two or more operations may be performed in parallel.

In operation 1110, the delivery robot service provider 17 may generate delivery information on an approved delivery request. The delivery information may include at least one of a pick-up location, a delivery location, a delivery time, information (e.g., a location or an identifier) on infrastructure that needs to interwork with a delivery robot, a delivery route, the type of goods, the weight of the goods, the size of the goods, and a delivery condition (e.g., a proper temperature).

In operation 1120, the delivery robot service provider 17 may assign the delivery robot 11 to perform the approved delivery request.

In operation 1130, the delivery robot service provider 17 may receive an urgent request from the urban control center 45. For example, the urban control center 45 may notify the delivery robot service provider 17 of a fire in a building in the vicinity of the delivery robot service provider 17 and may request the delivery robot service provider 17 to provide information (e.g., visual information) on the current status of the building.

In operation 1140, the delivery robot service provider 17 may analyze the urgent request received from the urban control center 45. For example, the delivery robot service provider 17 may determine the importance (or priority) of the urgent request. In operation 1140, the delivery robot service provider 17 may determine a delivery robot (e.g., the delivery robot 11) to perform a task of the urgent request.

In operation 1150, the delivery robot service provider 17 may control the delivery robot 11. For example, the delivery robot service provider 17 may transmit a command to capture the inside/outside of the building where the fire broke out to the delivery robot 11.

In operation 1160, the delivery robot 11 may collect information (e.g., an image, a video, or sound) based on the control of the delivery robot service provider 17.

In operation 1170, the delivery robot 11 may transmit the collected information to the delivery robot service provider 17.

In operation 1180, the delivery robot service provider 17 may transmit the collected information to the urban control center 45.

Figure 12:
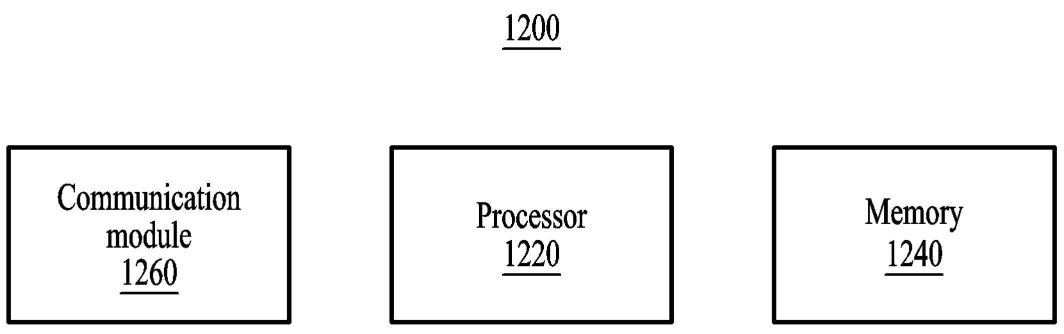
FIG. 12 is a schematic block diagram illustrating a delivery robot according to an embodiment.

FIG. 12 is a schematic block diagram illustrating a delivery robot according to an embodiment.

Referring to FIG. 12, according to an embodiment, a delivery robot 1200 (e.g., the delivery robot 11 of FIGS. 1 to 11) may include a processor 1220, a memory 1240, and a communication module 1260.

The memory 1240 may store instructions (or programs) executable by the processor 1220. For example, the instructions may include instructions for executing an operation of the processor 1220 and/or an operation of each component of the processor 1220.

The memory 1240 may include one or more computer-readable storage media. The memory 1240 may include non-volatile storage elements (e.g., a magnetic hard disk, an optical disc, a floppy disc, a flash memory, an electrically programmable memory (EPROM), and an electrically erasable and programmable memory (EEPROM)).

The memory 1240 may be a non-transitory medium. The term "non-transitory" may indicate that a storage medium is not embodied in a carrier wave or a propagated signal. However, the term "non-transitory" should not be interpreted to mean that the memory 1240 is non-movable.

The processor 1220 may process data stored in the memory 1240. The processor 1220 may execute computer-readable code (e.g., software) stored in the memory 1240 and instructions triggered by the processor 1220.

The processor 1220 may be a data processing device implemented by hardware including a circuit having a physical structure to perform desired operations. For example, the desired operations may include code or instructions included in a program.

For example, the hardware-implemented data processing device may include a microprocessor, CPU, a processor core, a multi-core processor, a multiprocessor, an ASIC, and an FPGA.

The processor 1220 may cause the delivery robot 1200 to perform one or more operations by executing the code, instructions, and/or applications stored in the memory 1240. The operations performed by the delivery robot 1200 may be substantially the same as the operations performed by the delivery robot 11 described with reference to FIGS. 1 to 11. Accordingly, a repeated description thereof is omitted.

The communication module 1260 may establish a communication channel (e.g., a wireless communication channel) for communication. The communication module 1260 may support the communication through the established communication channel. The communication module 1260 may include one or more communication processors configured to support direct (or wired) communication or wireless communication. The communication module 1260 may include a wireless communication module (e.g., a cellular communication module, a short-range wireless communication module, or a global navigation satellite system (GNSS) communication module) or a wired communication module 1794 (e.g., a local area network (LAN) communication module, or a power line communication (PLC) module).

Figure 13:
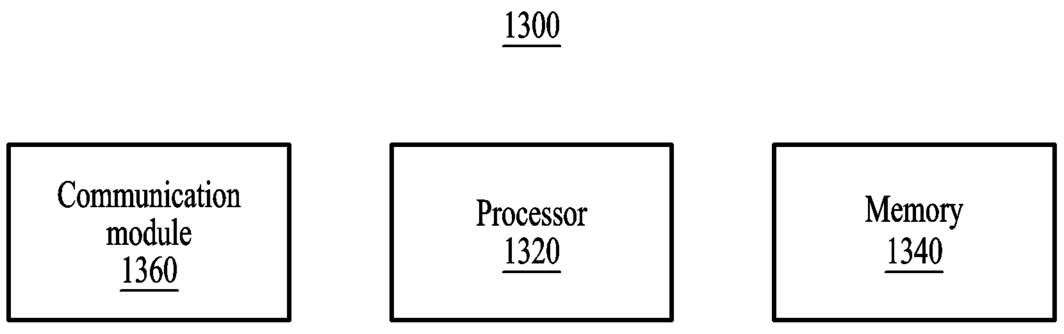
FIG. 13 is a schematic block diagram illustrating a delivery robot service provider according to an embodiment.

FIG. 13 is a schematic block diagram illustrating a delivery robot service provider according to an embodiment.

Referring to FIG. 13, according to an embodiment, a delivery robot service provider 1300 (e.g., the delivery robot service provider 17 of FIGS. 1 to 11) may include a processor 1320, a memory 1340, and a communication module 1360.

The memory 1340 may store instructions (or programs) executable by the processor 1320. For example, the instructions may include instructions for executing an operation of the processor 1320 and/or an operation of each component of the processor 1320.

The memory 1340 may include one or more computer-readable storage media. The memory 1340 may include non-volatile storage elements (e.g., a magnetic hard disk, an optical disc, a floppy disc, a flash memory, an EPROM, and an EEPROM).

The memory 1340 may be a non-transitory medium. The term "non-transitory" may indicate that a storage medium is not embodied in a carrier wave or a propagated signal. However, the term "non-transitory" should not be interpreted to mean that the memory 1340 is non-movable.

The processor 1320 may process data stored in the memory 1340. The processor 1320 may execute computer-readable code (e.g., software) stored in the memory 1340 and instructions triggered by the processor 1320.

The processor 1320 may be a data processing device implemented by hardware including a circuit having a physical structure to perform desired operations. For example, the desired operations may include code or instructions included in a program.

For example, the hardware-implemented data processing device may include a microprocessor, CPU, a processor core, a multi-core processor, a multiprocessor, an ASIC, and an FPGA.

The processor 1320 may cause the delivery robot service provider 1300 to perform one or more operations by executing the code, instructions, and/or applications stored in the memory 1340. The operations performed by the delivery robot service provider 1300 may be substantially the same as the operations performed by the delivery robot service provider 17 described with reference to FIGS. 1 to 11. Accordingly, a repeated description thereof is omitted.

The communication module 1360 may establish a communication channel (e.g., a wireless communication channel) for communication. The communication module 1360 may support the communication through the established communication channel. The communication module 1360 may include one or more communication processors configured to support direct (or wired) communication or wireless communication. The communication module 1360 may include a wireless communication module (e.g., a cellular communication module, a short-range wireless communication module, or a GNSS communication module) or a wired communication module (e.g., a LAN communication module, or a PLC module).

The examples described herein may be implemented by using a hardware component, a software component, and/or a combination thereof. A processing device may be implemented using one or more general-purpose or special-purpose computers, such as, for example, a processor, a controller and an arithmetic logic unit (ALU), a digital signal processor (DSP), a microcomputer, an FPGA, a programmable logic unit (PLU), a microprocessor, or any other device capable of responding to and executing instructions in a defined manner. The processing device may run an operating system (OS) and one or more software applications that run on the OS. The processing unit also may access, store, manipulate, process, and generate data in response to execution of the software. For purpose of simplicity, the description of a processing unit is used as singular; however, one skilled in the art will appreciate that a processing unit may include multiple processing elements and multiple types of processing elements. For example, the processing unit may include a plurality of processors, or a single processor and a single controller. In addition, different processing configurations are possible, such as parallel processors.

The software may include a computer program, a piece of code, an instruction, or some combination thereof, to independently or collectively instruct or configure the processing unit to operate as desired. Software and data may be stored in any type of machine, component, physical or virtual equipment, or computer storage medium or device capable of providing instructions or data to or being interpreted by the processing unit. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape;

optical media such as CD-ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

The above-described devices may act as one or more software modules in order to perform the operations of the above-described examples, or vice versa.

As described above, although the examples have been described with reference to the limited drawings, a person skilled in the art may apply various technical modifications and variations based thereon. For example, suitable results may be achieved if the described techniques are performed in a different order, and/or if components in a described system, architecture, device, or circuit are combined in a different manner, or replaced or supplemented by other components or their equivalents.

Although the disclosure has been illustrated and explained with reference to various embodiments, it will be understood by those skilled in the art that the various embodiments are intended to be illustrative but not restrictive. It will be understood by those skilled in the art that various changes in forms and details may be made without departing from the true spirit and full scope of this disclosure including the scope of the attached claims and their equivalents. Also, it will be understood by those skilled in the art that any of the embodiments described herein may be used in conjunction with other embodiments described herein.

Therefore, other implementations, other examples, and equivalents to the claims are also within the scope of the following claims.

What is claimed is:

1. An operating method of a delivery robot, the operating method comprising:

moving to a pick-up location through autonomous driving based on delivery information generated by a delivery robot service provider;

loading goods at the pick-up location;

delivering the goods to a delivery location through autonomous driving based on the delivery information;

sharing a current location of the delivery robot, a loading status of the goods, a type of the goods, and a status of the goods with the delivery robot service provider, interworking with an infrastructure located on a delivery route of the goods, and directly interworking with another delivery robot located at a preset distance from the delivery robot based on a prediction of a collision between the delivery robot and the another delivery robot and a congestion level related to a space surrounding the delivery robot, wherein the directly interworking comprises:

calculating the congestion level based on an area of the space surrounding the delivery robot, a type of the space surrounding the delivery robot, a size of the delivery robot, and a size of the another delivery robot, and directly interworking with the another delivery robot when the congestion level satisfies a threshold value.

2. The operating method of claim 1, wherein the delivery information comprises:

at least one of the pick-up location of the goods, the delivery location of the goods, a delivery time of the goods, information on an infrastructure that the delivery robot needs to interwork with for the delivery of the goods, a delivery route of the goods, and a type of the goods.

3. The operating method of claim 1, wherein the delivery robot service provider retains information on an infrastructure that interworks with the delivery robot.

4. The operating method of claim 1, further comprising notifying the delivery robot service provider of a result of direct interworking with the infrastructure.

5. The operating method of claim 1, wherein the delivery robot service provider determines an access priority to the infrastructure between the delivery robot and another delivery robot based on a presence of the other delivery robot competing with the delivery robot to access the infrastructure.

6. The operating method of claim 5, wherein the delivery robot service provider determines the access priority by interworking with another delivery robot service provider when the other delivery robot is managed by the other delivery robot service provider.

7. The operating method of claim 1, wherein the delivery robot service provider transmits a loading status of the goods or an unloading status of the goods to a corresponding user device.

8. A delivery robot, comprising:

a processor; and a memory configured to store instructions, wherein, when the instructions are executed by the processor, the instructions cause the delivery robot to perform a plurality of operations, and the plurality of operations comprises:

moving to a pick-up location through autonomous driving based on delivery information generated by a delivery robot service provider based on a delivery request of a user;

loading goods at the pick-up location;

delivering the goods to a delivery location through autonomous driving based on the delivery information;

sharing a current location of the delivery robot, a loading status of the goods, a type of the goods, and a status of the goods with the delivery robot service provider, interworking with an infrastructure located on a delivery route of the goods, and directly interworking with another delivery robot located at a preset distance from the delivery robot based on a prediction of a collision between the delivery robot and the another delivery robot and a congestion level related to a space surrounding the delivery robot, wherein the directly interworking comprises:

calculating the congestion level based on an area of the space surrounding the delivery robot, a type of the space surrounding the delivery robot, a size of the delivery robot, and a size of the another delivery robot, and directly interworking with the another delivery robot when the congestion level satisfies a threshold value.

9. The delivery robot of claim 8, wherein the delivery information comprises:

at least one of the pick-up location of the goods, the delivery location of the goods, a delivery time of the goods, information on an infrastructure that the delivery robot needs to interwork with for the delivery of the goods, a delivery route of the goods, and a type of the goods.

10. The delivery robot of claim 8, wherein the delivery robot service provider retains information on an infrastructure that interworks with the delivery robot.

11. The delivery robot of claim 8, wherein the plurality of operations further comprises notifying the delivery robot service provider of a result of direct interworking with the infrastructure.

12. The delivery robot of claim 8, wherein the delivery robot service provider determines an access priority to the infrastructure between the delivery robot and another delivery robot based on a presence of the other delivery robot competing with the delivery robot to access the infrastructure.

13. The delivery robot of claim 12, wherein the delivery robot service provider determines the access priority by interworking with another delivery robot service provider when the other delivery robot is managed by the other delivery robot service provider.

14. The delivery robot of claim 8, wherein the delivery robot service provider transmits the loading status of the goods or an unloading status of the goods to a corresponding user device.

* * * * *